United States Patent [19]
Coleman et al.

[11] Patent Number: 5,799,969
[45] Date of Patent: Sep. 1, 1998

[54] VEHICLE OCCUPANT PROTECTION APPARATUS

[75] Inventors: Daniel E. Coleman, Mesa; Thomas O. Minor, Scottsdale, both of Ariz.

[73] Assignee: TRW Inc., Lyndhurst, Ohio

[21] Appl. No.: 819,890

[22] Filed: Mar. 18, 1997

[51] Int. Cl.$^6$ ............................................. B60R 21/16
[52] U.S. Cl. ............................... 280/728.2; 280/741
[58] Field of Search .......................... 280/737, 741, 280/732, 728.2, 740, 736, 731

[56] References Cited

U.S. PATENT DOCUMENTS

| | | |
|---|---|---|
| 3,904,221 | 9/1975 | Shiki et al. . |
| 4,114,924 | 9/1978 | Kasagi et al. ............... 280/740 |
| 4,153,273 | 5/1979 | Risko . |
| 4,919,897 | 4/1990 | Bender et al. . |
| 4,964,654 | 10/1990 | Bishop et al. . |
| 5,263,740 | 11/1993 | Frey et al. ................... 280/737 |
| 5,294,414 | 3/1994 | Brede et al. . |
| 5,468,012 | 11/1995 | Mihm ......................... 280/728.2 |
| 5,472,229 | 12/1995 | Bishop et al. . |
| 5,498,030 | 3/1996 | Hill et al. . |
| 5,529,333 | 6/1996 | Rizzi et al. ................. 280/740 |
| 5,542,691 | 8/1996 | Marjanski et al. . |
| 5,662,352 | 9/1997 | Headley et al. ............ 280/737 |

*Primary Examiner*—Paul N. Dickson
*Attorney, Agent, or Firm*—Tarolli, Sundheim, Covell Tummino & Szabo

[57] ABSTRACT

A vehicle occupant protection apparatus (10) includes a reaction structure (16), an inflator (14) for inflating a vehicle occupant protection device (12), an initiator (102) for initiating a flow of inflation fluid from the inflator (14), and a tubular connector (104) containing the initiator (102). The connector (104) engages the inflator (14), and extends through an aperture (176) in the reaction structure (16). A fastener (182) engages the connector (104) to fasten the connector (104), the initiator (102) and the inflator (14) to the reaction structure (16). In a preferred embodiment, the apparatus (10) further includes a diffuser (150) with a circular end wall (152) and a cylindrical side wall (154) projecting axially from the end wall (152). The side wall (154) of the diffuser (150) has fluid flow openings (156), and has an annular edge portion (158) crimped against a rim structure (160) on the inflator (14). A mounting stud (162) projects radially from the diffuser (150) and extends through an aperture (178) in the reaction structure (16). Another fastener (180) engages the mounting stud (182) to fasten the diffuser (150) and the inflator (14) to the reaction structure (16).

13 Claims, 2 Drawing Sheets

VEHICLE OCCUPANT PROTECTION APPARATUS

FIELD OF THE INVENTION

The present invention relates to an apparatus for protecting an occupant of a vehicle, and particularly relates to an apparatus including an inflatable vehicle occupant protection device.

BACKGROUND OF THE INVENTION

An inflatable vehicle occupant protection device, such as an air bag, is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment to help protect an occupant of the vehicle from a forceful impact with parts of the vehicle.

An air bag and an inflator are typically assembled together as parts of an air bag module which is separate from the crash sensor. The air bag module is located in the vehicle adjacent to the vehicle occupant compartment. For example, a driver's side air bag module may be located on the vehicle steering column. A passenger side air bag module may be located in the vehicle instrument panel. In addition to the air bag and the inflator, an air bag module includes a reaction structure which supports the inflator and the other parts of the module in the vehicle.

SUMMARY OF THE INVENTION

In accordance with one aspect of the present invention, an apparatus comprises a reaction structure, an inflator and an initiator. The inflator comprises a source of fluid for inflating a vehicle occupant protection device. The initiator, when actuated, initiates a flow of fluid from the inflator. The apparatus further comprises a tubular connector which contains the initiator. The connector engages the inflator, and extends through an aperture in the reaction structure. A fastener engages the connector to fasten the connector, the initiator and the inflator to the reaction structure.

In accordance with another aspect of the present invention, an apparatus comprises a reaction structure, an inflator and a diffuser. The inflator has a rupturable closure part and an annular rim structure surrounding the closure part. The diffuser has a circular end wall and a cylindrical side wall projecting axially from the end wall. The side wall of the diffuser has a plurality of fluid flow openings, and has an annular edge portion crimped against the rim structure on the inflator. The diffuser further has a radially projecting mounting stud extending through an aperture in the reaction structure. A fastener engages the mounting stud to fasten the diffuser and the inflator to the reaction structure.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
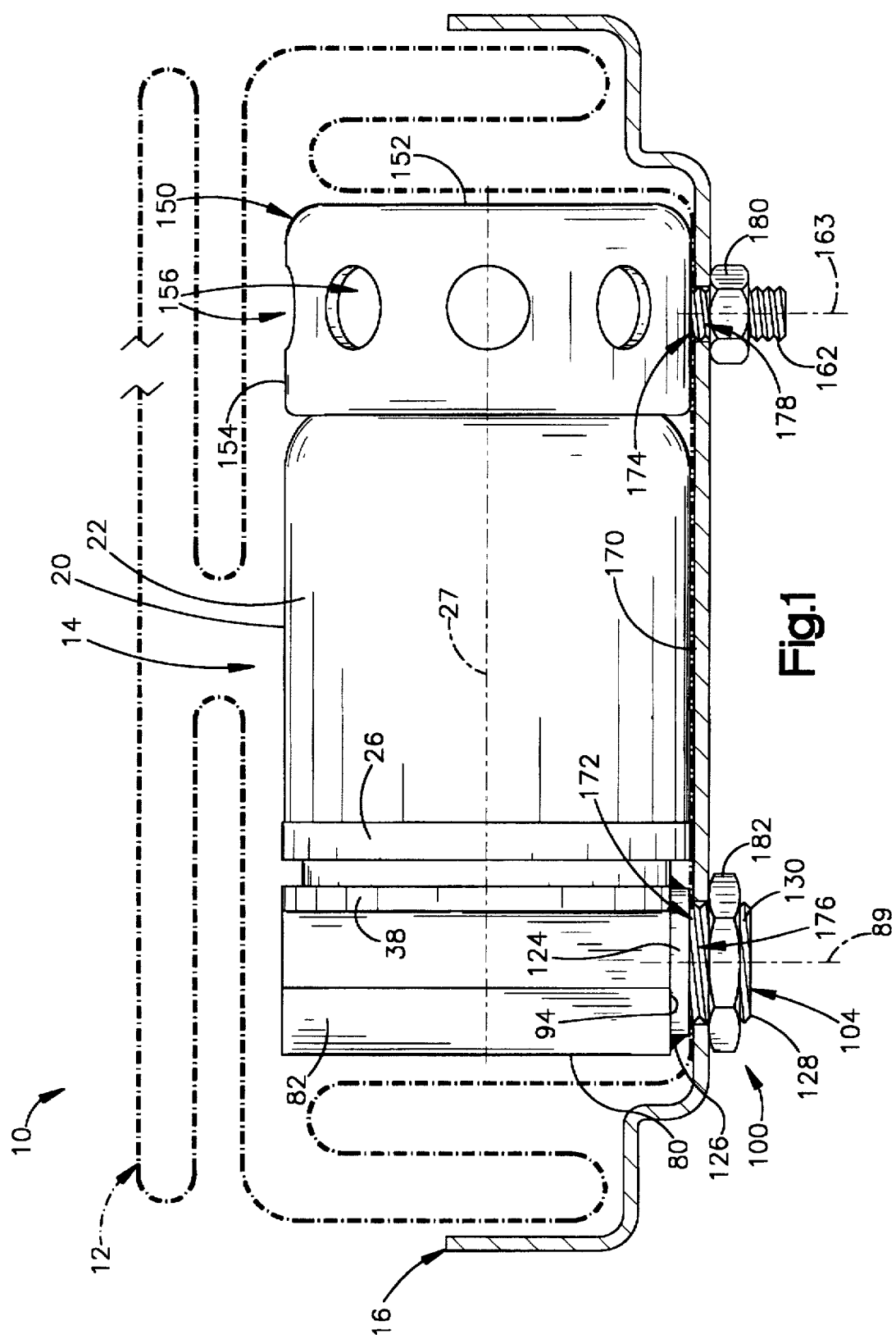
FIG. 1 is a side view of an apparatus comprising a preferred embodiment of the present invention.

An apparatus 10 comprising a preferred embodiment of the present invention is shown in FIG. 1. The apparatus 10 includes a particular type of inflatable vehicle occupant protection device 12 (shown schematically) which is commonly referred to as an air bag. The apparatus 10 further includes an inflator 14 for inflating the air bag 12. The inflator 14 and the air bag 12 are supported on a reaction structure 16. In the preferred embodiment of the present invention, the reaction structure 16 is a base plate for supporting the inflator 14 and the air bag 12 on a vehicle steering column (not shown) in a known manner. The base plate 16, the inflator 14 and the air bag 12 are preferably parts of an air bag module which, as known in the art, includes other parts (not shown) such as an air bag cover and a horn switch. Such other parts of the module can be connected to the base plate 16 in any suitable manner known in the art.

The inflator 14 comprises a container 20 storing pressurized inflation fluid for inflating the air bag 12. As shown in greater detail in FIGS. 2 and 3, the container 20 has a generally cylindrical shape defined by a tubular side wall 22, a first circular end wall 24, and a second circular end wall 26, each of which is centered on a longitudinal axis 27.

The side wall 22 and the first end wall 24 of the container 20 are portions of a single, continuous piece of metal such as steel or aluminum. A circular outlet opening 28 extends through the center of the first end wall 24. A rupturable closure disk 30 extends across the outlet opening 28, and is fixed and sealed to the first end wall 24 by a circumferentially extending weld 32. The closure disk 30 may have any suitable structure known in the art, but preferably has a plurality of radially extending score lines 34. The score lines 34 delineate a corresponding plurality of petal-shaped sections 36 of the closure disk 30 which separate and deflect axially outward when the closure disk 30 is ruptured.

The second end wall 26 of the container 20 has a circular base portion 38 with an annular end surface 40. The end surface 40 abuts an opposed annular end surface 42 of the side wall 22. A friction weld 44 fixes and seals the second end wall 26 and the side wall 22 together at the abutting end surfaces 40 and 42 circumferentially entirely around the axis 27. The three walls 22, 24 and 26 of the container 20 thus define a cylindrical storage chamber 46. The storage chamber 46 contains pressurized inflation fluid such as, for example, nitrogen, argon, or a mixture of oxygen with an inert gas such as nitrogen and/or argon.

A cylindrical inner portion 48 of the second end wall 26 projects axially from the base portion 38 into the storage chamber 46. The inner portion 48 defines a cylindrical combustion chamber 50 which contains a charge of ignitable gas generating material 52 (shown schematically). The gas generating material 52 may have any suitable composition known in the art.

The combustion chamber 50 has an inlet opening 54 and a plurality of intermediate openings 56. The inlet opening 54 is centered on the axis 27, and is closed by a rupturable closure disk 58. Like the closure disk 30 at the opposite end of the container 20, the closure disk 58 is fixed and sealed to the corresponding end wall 26 of the container 20 by a circumferentially extending weld 60.

The second end wall 26 of the container 20 further has an outer portion 80. The outer portion 80 has a pair of bevelled outer edges 82 (FIG. 3), but otherwise has a generally rectangular configuration with a length extending diametrically across the axis 27 and a height extending outward along the axis 27.

The outer portion 80 and the base portion 38 of the end wall 26 together define a conduit 83. A first section 85 of the conduit 83 extends outward from the inlet opening 54 along the longitudinal axis 27. A second section 87 of the conduit 83 extends from the first section 85 along a transverse axis 89 perpendicular to the longitudinal axis 27. The conduit 83 thus has a 90° turn at the juncture of the first and second sections 85 and 87. Moreover, the second section 87 of the conduit 83 has a widened open end portion 90. A planar outer surface 94 of the second end wall 26 surrounds the open end portion 90.

Figure 2:
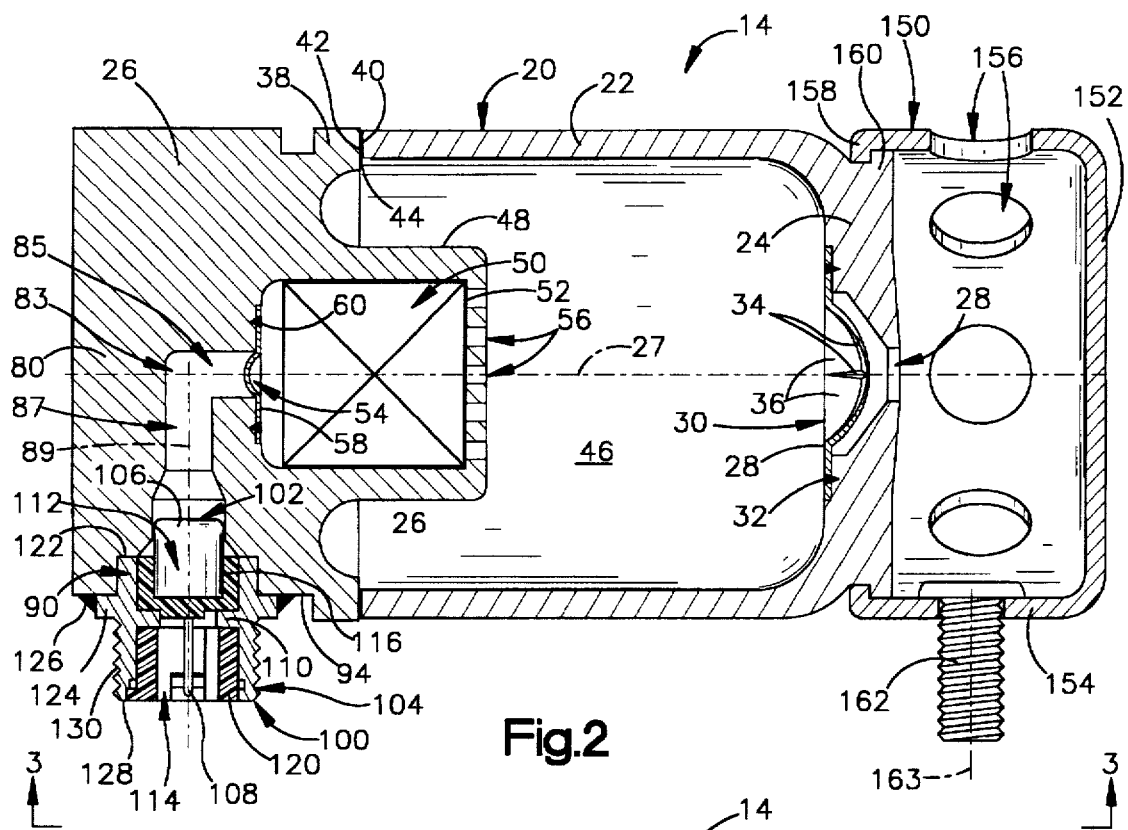
FIG. 2 is a sectional side view of parts of the apparatus of FIG. 1.
Figure 3:
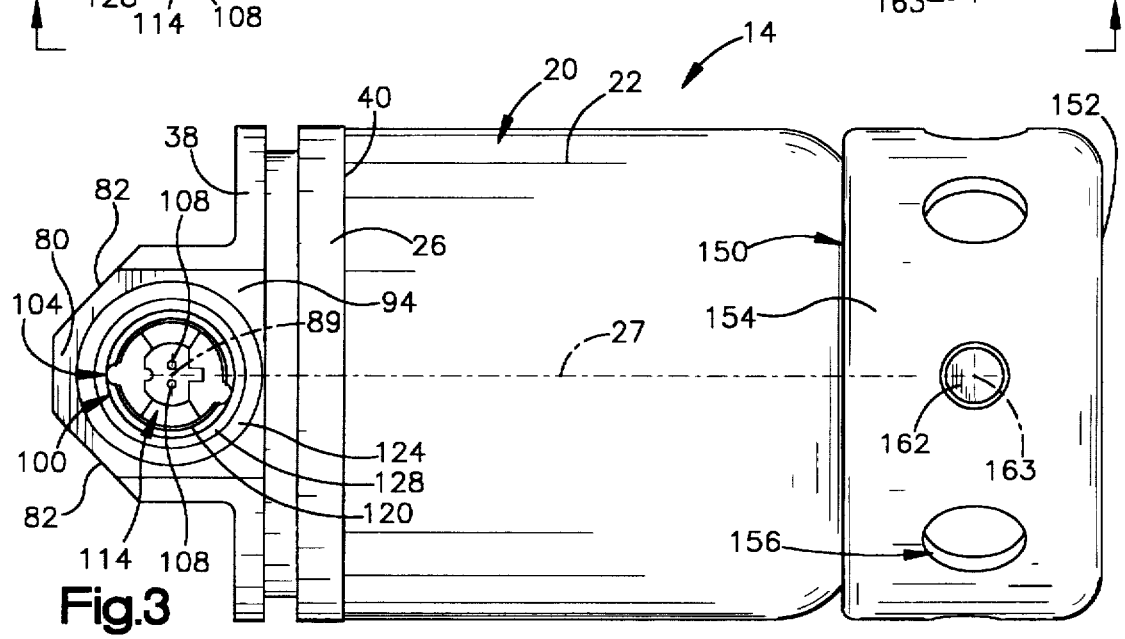
FIG. 3 is a view taken on line 3—3 of FIG. 2.

An initiator assembly 100 is mounted on the second end wall 26 of the container 20, as best shown in FIGS. 2 and 3. The initiator assembly 100 includes an initiator 102 and a connector 104. The initiator 102 in the preferred embodiment of the present invention is an electrically actuatable squib with a cylindrical casing 106 and a pair of electrical contact pins 108. As known in the art, the casing 106 contains a small charge of pyrotechnic material which is ignited upon the passage of electric current through the initiator 102 between the contact pins 108.

The connector 104 is a tubular cylindrical part centered on the transverse axis 89. An annular inner wall portion 110 of the connector 104 is located axially between first and second cylindrical compartments 112 and 114 within the connector 104. The initiator casing 106 and a surrounding plastic support body 116 are insert molded together in the first compartment 112. The contact pins 108 project axially from the first compartment 112 into the second compartment 114. A plastic socket 120 is molded in place in the second compartment 114. The socket 120 is shaped to receive an electrical terminal (not shown) for connection of the initiator 102 in an electrical circuit in a vehicle.

A first end portion 122 of the connector 104 is received in the widened open end portion 90 of the conduit 83. An annular, radially outwardly projecting flange 124 on the connector 104 abuts the planar outer surface 94 of the end wall 26. The flange 124 is fixed and sealed to the end wall 26 at the outer surface 94 by a circumferentially extending weld 126. A second end portion 128 of the connector 104 projects from the end wall 26, and has an external screw thread 130 centered on the transverse axis 89.

A diffuser 150 is mounted on the inflator 14 at the first end wall 24 of the container 20. The diffuser 150 is a cup-shaped structure with a circular end wall 152 and a cylindrical side wall 154. The end wall 152 of the diffuser 150 is centered on the longitudinal axis 27, and is preferably closed throughout its entire area. The side wall 154 projects axially from the end wall 152, and has a plurality of inflation fluid outlet openings 156 in a circumferentially extending array. An annular edge portion 158 of the side wall 154 is crimped against an annular rim structure 160 at the outside of the first end wall 22. The diffuser 150 is thus fixed and sealed to the container 20 circumferentially entirely around the axis 27.

The diffuser 150 further has a screw-threaded mounting stud 162. The mounting stud 162 projects radially from the side wall 154 along a transverse axis 163 which is parallel to the transverse axis 89 at the second end wall 26.

The air bag 12, the inflator 14 and the base plate 16 are interconnected, as shown in FIG. 1, by first placing a base portion 170 of the air bag 12 between the inflator 14 and the base plate 16. The base portion 170 of the air bag 12 has a pair of apertures 172 and 174. The second end portion 128 of the connector 104 and the mounting stud 162 are received through the apertures 172 and 174, respectively, and further through another pair of apertures 176 and 178 in the base plate 16. A fastener in the form of a nut 180 is received on the mounting stud 162. The nut 180 is tightened against the base plate 16 to fasten the diffuser 150 and the inflator 14 to the base plate 16. Another fastener in the form of a nut 182 is received on the second end portion 128 of the connector 104, and likewise fastens the connector 104, the initiator 100 and the inflator 14 to the base plate 16. The base portion 170 of the air bag 12 is thus clamped between the inflator 14 and the base plate 16.

Figure 4:
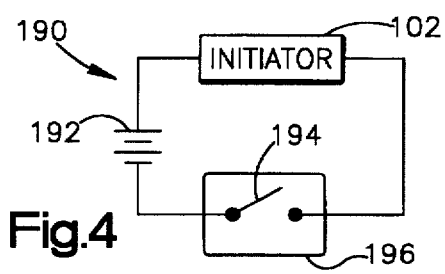
FIG. 4 is a schematic view of an electrical circuit including parts of the apparatus of FIG. 1.

As noted above, the initiator 102 is connected in an electrical circuit when the apparatus 10 of FIG. 1 is installed in a vehicle. As shown schematically by way of example in FIG. 4, such an electrical circuit 190 includes a power source 192, which is preferably the vehicle battery or a capacitor, and a normally open switch 194. The switch 194 is part of a crash sensor 196 which senses a vehicle condition indicating the occurrence of a crash. The crash-indicating condition may comprise, for example, sudden vehicle deceleration that is caused by a crash. If the crash-indicating condition is at or above a predetermined threshold level, the switch 194 closes and electric current flows through the circuit 190. Electric current is then directed through the initiator 102 between the contact pins 108 (FIGS. 2 and 3) to actuate the initiator 102.

When the initiator 102 is actuated in the foregoing manner, the pyrotechnic material in the casing 106 is ignited and generates products of combustion including heat, hot particles and hot gases. The combustion products are spewed into the conduit 83 from the casing 106, and are thus directed from the casing 106 to the rupturable closure disk 58 at the inlet opening 54. The closure disk 58 ruptures under the influence of the heat and pressure of the combustion products in the conduit 83. The combustion products then move into the combustion chamber 50 through the inlet opening 54 to ignite the gas generating material 52. The gas generating material 52, in turn, generates combustion products including heat and gases. Those combustion products move rapidly from the combustion chamber 50 to the storage chamber 46 through the intermediate openings 56. This heats and further pressurizes the inflation fluid in the storage chamber 46 to a level at which the force of the fluid pressure ruptures the closure disk 30 at the outlet opening 28. The heated, further pressurized inflation fluid then flows outward through the outlet opening 28 and the diffuser openings 156 to inflate the air bag 12.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a reaction structure;
   an inflator comprising a source of fluid for inflating a vehicle occupant protection device, said inflator having a rupturable closure part and an annular rim structure surrounding said closure part;
   a diffuser having a circular end wall and a cylindrical side wall projecting axially from said end wall, said side wall having a plurality of fluid flow openings and an annular edge portion crimped against said rim structure on said inflator, said diffuser further having a radially projecting mounting stud extending through an aperture in said reaction structure; and a fastener engaging said mounting stud to fasten said diffuser and said inflator to said reaction structure.

2. Apparatus as defined in claim 1 wherein said inflator stores pressurized inflation fluid.

3. Apparatus as defined in claim 1 wherein said reaction structure is a base plate which supports said inflator on a vehicle steering column.

4. Apparatus as defined in claim 1 wherein said apparatus further comprises a tubular connector containing an initiator which, when actuated, initiates a flow of said fluid from said inflator, said connector extending through an additional aperture in said reaction structure and being engaged by an additional fastener which fastens said connector, said initiator and said inflator to said reaction structure.

5. Apparatus as defined in claim 4 wherein said fastener has a screw thread engaging a screw thread on said tubular connector.

6. Apparatus as defined in claim 4 wherein said inflator comprises a cylindrical container storing pressurized inflation fluid, said initiator having a cylindrical shape with a longitudinal axis perpendicular to a longitudinal axis of said container.

7. Apparatus as defined in claim 4 wherein said tubular connector has first and second opposite end portions, said first end portion of said connector extending into a conduit in said inflator.

8. Apparatus as defined in claim 7 wherein said inflator has a closure part which is rupturable under the influence of combustion products emitted from said initiator, said conduit in said inflator having a 90 degree turn between said connector and said closure part.

9. Apparatus comprising:

a reaction structure;

an inflator comprising a source of fluid for inflating a vehicle occupant protection device;

an initiator which, when actuated, initiates a flow of said fluid from said inflator;

a tubular connector containing said initiator, said connector engaging said inflator and extending through an aperture in said reaction structure; and a fastener engaging said connector to fasten said connector, said initiator and said inflator to said reaction structure;

said tubular connector having first and second opposite end portions, said first end portion of said connector extending into a conduit in said inflator;

said inflator having a closure part which is rupturable under the influence of combustion products emitted from said initiator, said conduit having a 90 degree turn between said connector and said closure part.

10. Apparatus as defined in claim 9 wherein said inflator has an additional rupturable closure part and an annular rim structure surrounding said additional rupturable closure part, said apparatus further comprising a diffuser having a circular end wall and a cylindrical side wall projecting axially from said end wall, said side wall having a plurality of fluid flow openings and an annular edge portion crimped against said rim structure on said inflator.

11. Apparatus as defined in claim 10 wherein said diffuser has a mounting stud projecting from said side wall along an axis perpendicular to a longitudinal axis of said container, said mounting stud extending through an additional aperture in said reaction structure, said apparatus further comprising an additional fastener engaging said mounting stud to fasten said diffuser and said inflator to said reaction structure.

12. Apparatus comprising:

a reaction structure;

an inflator comprising a source of fluid for inflating a vehicle occupant protection device;

an initiator which, when actuated, initiates a flow of said fluid from said inflator;

a tubular connector containing said initiator, said connector engaging said inflator and extending through an aperture in said reaction structure; and a fastener engaging said connector to fasten said connector, said initiator and said inflator to said reaction structure;

said inflator comprising a cylindrical container defining a cylindrical fluid pressure chamber, said initiator and said connector having cylindrical shapes with longitudinal central axes perpendicular to a longitudinal central axis of said container.

13. Apparatus as defined in claim 12 further comprising an inflatable vehicle occupant protection device having a base portion clamped between said inflator and said reaction structure, said connector projecting through an aperture in said base portion of said protection device.

* * * * *